A. C. LIPPITT.
Butter-Dish.

No. 199,214. Patented Jan. 15, 1878.

Witnesses:
Will W. Dodge.
Donn P. Twitchell.

Inventor:
A. C. Lippitt.
By Dodge & Son
Attys.

UNITED STATES PATENT OFFICE.

ANDREW C. LIPPITT, OF NEW LONDON, CONNECTICUT.

IMPROVEMENT IN BUTTER-DISHES.

Specification forming part of Letters Patent No. 199,214, dated January 15, 1878; application filed December 21, 1877.

*To all whom it may concern:*

Be it known that I, ANDREW C. LIPPITT, of New London, in the county of New London and State of Connecticut, have invented certain Improvements in Butter-Dishes, of which the following is a specification:

My invention relates to the construction of butter-dishes; and the improvements consist in forming an ice-chamber above the butter-receptacle, the water resulting from the melting of the ice therein being caused to flow down upon the outside of sloping walls inclosing the butter, and to pass into a closed chamber below and surrounding the butter-receptacle, whereby the effect of the water, as well as of the ice, is utilized to the fullest extent, and the butter is cooled upon all sides.

The invention further consists in certain details of construction, whereby the water produced by the melting of the ice is caused to pass into the chamber provided for it, whether the dish be opened or closed, the intention being to construct the butter-receptacle, ice and water chambers complete, as one article, in contradistinction to cooling devices or covers designed to be placed over various dishes.

Figure 1:
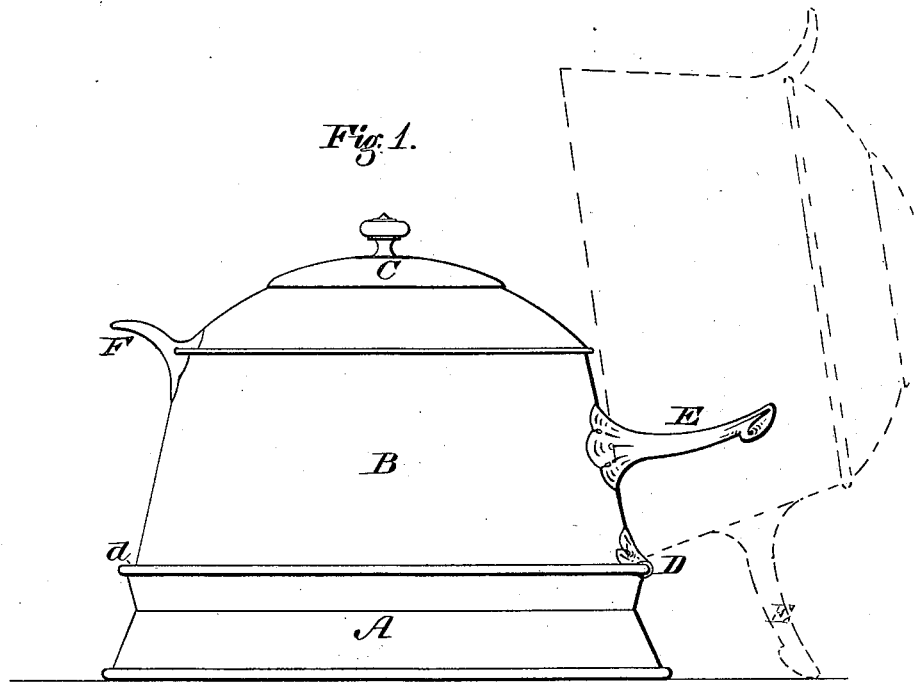
Figure 2:
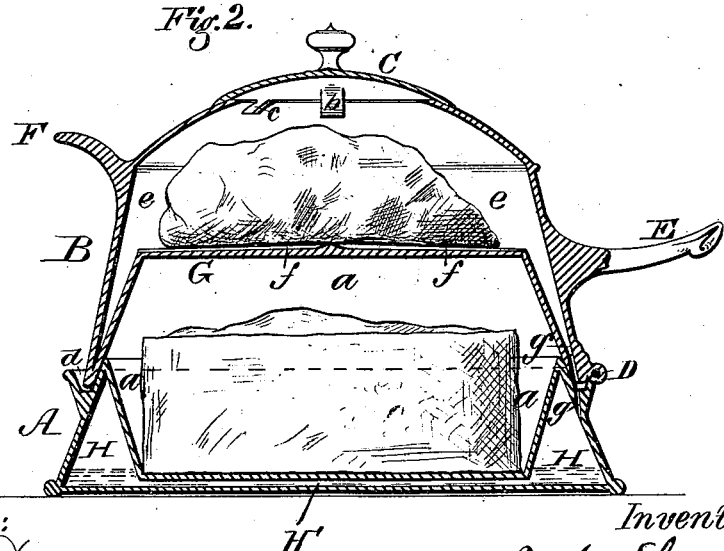

In the accompanying drawings, Figure 1 represents a side view of my improved device, and Fig. 2 a vertical central section of the same.

The object of this device is to furnish a dish in which butter may be kept hard and firm in warm weather, and which shall obviate the difficulties attendant upon placing the ice directly upon the butter, as is commonly done.

To this end I construct my improved dish as represented in Figs. 1 and 2, in which A represents the base of the dish, containing the butter receptacle or cup $a$, and B the cover, containing the ice-chamber $e$, the two parts A and B being hinged together, as shown. The base A has its sides or walls sloping outward at the bottom, giving a large base to the dish, and preventing its being readily upset, while the sides or walls of the butter receptacle or cup $a$, which join with those of the base at their upper edges, slope from that point inward, leaving an open space between the wall of the base and cup all around. A slight space, H', is also left between the bottoms of the base and cup, all as shown in Fig. 2.

The cover B is connected to the base A by a hinge-joint, D, and contains an ice-chamber, $e$, closed by a lid or cover, C, the bottom G of said ice-chamber being raised up within the cover B, and connected to the same by sloping walls extending downward, and uniting with the cover at its lower edge, whereby there is furnished additional space for the butter. The bottom G is made slightly higher at the center than at the sides, and is furnished with a series of radial grooves, $f$, in order to cause the water resulting from the melting of the ice to flow equally in all directions, and to pass down the sloping walls, which sustain the bottom on every side.

An opening, $g$, is made from the ice-chamber $e$ into the water-chamber H, through which the water from the ice-chamber passes, and in order that the opening in the upper portion or cover shall always stand directly over that in the lower or base portion, said opening or passage is located directly in front of the hinge or joint D, so that the two parts of the passage remain in line, whether the dish be opened or closed.

In order to gather the moisture occasioned by condensation, a rim, $d$, is formed around the base A, as shown in Figs. 1 and 2, extending out beyond the lower edge of the cover B, said rim gathering the moisture and conducting it around to the opening $g$, through which it enters the water-chamber H.

It will be observed that by the above construction the full benefit of the ice is utilized. The water therefrom is caused to pass over the walls surrounding the butter slowly but continually while the ice remains, and that it is finally caused to cover the bottom and a portion of the side walls of the butter-cup, thus gaining the most effective action possible.

It will also be noticed that the ice is not permitted by this construction to remain in water, and thus hasten its change to water; and finally it will be observed that the butter-cup is entirely surrounded by double walls, the entire space between them being filled with cold air.

In order to prevent the cover from falling sufficiently far back to prevent the escape of the water from the ice-chamber $e$, I furnish the same with a support or rest, E, by which its backward movement is limited; and in order to permit the ready opening of the dish, a lip or handle, F, is attached to or formed upon the front of the same.

The opening through which the ice is placed into the ice-chamber may be closed by any suitable means which shall not be liable to become loose or open when the lid is thrown back, a convenient arrangement being shown in Fig. 1, consisting of a lid, C, having ears $b$, which enter through notches or openings $c$, and are then turned around under the solid part of the cover, as shown.

An advantage arising from the slope given the walls of the base and cover, in addition to those mentioned, is found in the perfect sealing of the joint between them, which is always tight, even when worn.

I am aware that various attempts have been made to produce a butter-dish to accomplish the objects of this; but, so far as I am aware, no dish has ever been constructed containing an ice-chamber and having the cover and body attached one to the other; nor am I aware that a butter-dish has ever been made with a chamber surrounding the butter-cup, and serving as a receptacle for the waste water; neither am I aware that any one has hitherto caused the water from the ice to pass down upon all sides of the butter-chamber, and thus serve to cool the same.

The disadvantages of a detachable cover containing an ice-chamber are apparent, a cover of this description requiring a plate or dish in which to place it when removed from the body, if provided with a water-escape, or holding the water in contact with the ice and greatly hastening its melting when not provided with such escape; but these difficulties are entirely obviated by my construction.

It is obvious that the rest or support E may be omitted and a hinge provided with a stop used to accomplish the same result, though the construction shown is preferred, as the dish is less readily upset when thus made.

Having thus described my invention, what I claim is—

1. The butter-dish consisting of the base A, having hollow bottom and side walls, and the top B, having the ice-chamber communicating with the interior of the base, as shown, whereby the butter may be completely surrounded by cold air and water.

2. In combination with the butter cup or base having the hollow walls, the hollow top or ice chamber B hinged thereto, and communicating therewith by a passage, $g$, at the hinge, as shown, whereby the flow of water from the top to the base is permitted when the dish is open as well as when it is closed.

3. In combination with the top B, the hollow base or cup A, provided with the annular groove $d$, communicating with the interior by a passage, $g$, and serving the double purpose set forth.

4. The top or ice chamber provided with the radial grooves $f$, as and for the purpose shown and described.

5. In combination with the base A, the hinged top B, provided with the rest E, serving the double purpose of sustaining the top and preventing the overturning of the dish.

6. A butter-dish consisting of a top ice-chamber and a bottom butter-dish, constructed with hollow walls to inclose the butter on all sides, and provided with a passage for the water from the top to the bottom.

ANDREW C. LIPPITT.

Witnesses:
 LEMUEL CLIFT,
 PERRY WILLIAMS.